(12) United States Patent　(10) Patent No.: US 7,960,939 B2
Steimer　(45) Date of Patent: Jun. 14, 2011

(54) FUEL/ELECTRIC DRIVE SYSTEM

(75) Inventor: Peter Steimer, Ehrendingen (CH)

(73) Assignee: ABB Schweiz AG, Baden (CH)

( * ) Notice: Subject to any disclaimer, the term of this patent is extended or adjusted under 35 U.S.C. 154(b) by 350 days.

(21) Appl. No.: 12/219,119

(22) Filed: Jul. 16, 2008

(65) Prior Publication Data

US 2008/0297088 A1　Dec. 4, 2008

Related U.S. Application Data

(63) Continuation of application No. PCT/CH2006/000156, filed on Mar. 16, 2006.

(60) Provisional application No. 60/759,053, filed on Jan. 17, 2006.

(51) Int. Cl.
*H02M 7/00* (2006.01)
*H02P 1/54* (2006.01)

(52) U.S. Cl. .............. 318/803; 318/105; 363/71; 363/65

(58) Field of Classification Search .................. 318/105, 318/797, 800, 801, 803; 363/16, 148, 71, 363/34, 65, 37, 69, 40, 105; 322/14, 22, 322/44; 307/22, 26, 10.1, 82
See application file for complete search history.

(56) References Cited

U.S. PATENT DOCUMENTS

| 4,084,220 | A | * | 4/1978 | Akamatsu | 363/37 |
| 4,392,099 | A | * | 7/1983 | Kuniyoshi | 318/797 |
| 4,849,870 | A | * | 7/1989 | Heinrich | 363/37 |
| 5,050,059 | A | * | 9/1991 | Neeser et al. | 363/65 |
| 6,281,664 | B1 | * | 8/2001 | Nakamura et al. | 322/22 |
| 6,665,158 | B2 | * | 12/2003 | Walter | 361/18 |
| 6,946,750 | B2 | * | 9/2005 | Wobben | 290/44 |
| 7,023,171 | B2 | * | 4/2006 | Su et al. | 318/400.26 |
| 7,358,684 | B2 | * | 4/2008 | Wey et al. | 315/277 |
| 7,535,738 | B2 | * | 5/2009 | Wei et al. | 363/71 |
| 7,687,929 | B2 | * | 3/2010 | Fattal | 322/44 |
| 2003/0155813 | A1 | * | 8/2003 | Walter | 307/31 |
| 2006/0109701 | A1 | * | 5/2006 | Morcov et al. | 363/148 |
| 2008/0157594 | A1 | * | 7/2008 | Peterson et al. | 307/10.1 |
| 2009/0033251 | A1 | * | 2/2009 | Perisic et al. | 318/105 |
| 2009/0109709 | A1 | * | 4/2009 | Nakahori | 363/16 |
| 2009/0174257 | A1 | * | 7/2009 | Li et al. | 307/31 |

FOREIGN PATENT DOCUMENTS

| DE | 28 23 225 A1 | 11/1979 |
| EP | 0 577 980 A1 | 1/1994 |
| FR | 2 756 118 A1 | 5/1998 |

* cited by examiner

*Primary Examiner* — Eduardo Colon Santana
(74) *Attorney, Agent, or Firm* — Buchanan Ingersoll & Rooney PC (57) ABSTRACT

A fuel/electric drive system having an internal combustion engine is disclosed, having a generator which is driven by the internal combustion engine and has a first stator winding set, having a first rectifier which is connected to the first stator winding set at the AC voltage end and to a first DC voltage circuit at the DC voltage end, and having a first inverter which is connected to the first DC voltage circuit at the DC voltage end and to a drive motor at the AC voltage end. In order to increase the robustness and availability of the fuel/electric drive system, the generator has a second stator winding set, with a second rectifier being connected to the second stator winding set at the AC voltage end and to a second DC voltage circuit at the DC voltage end, and a second inverter being connected to the second DC voltage circuit at the DC voltage end and to the drive motor at the AC voltage end.

24 Claims, 6 Drawing Sheets

Fig. 1

PRIOR ART

FUEL/ELECTRIC DRIVE SYSTEM

RELATED APPLICATIONS

This application claims priority under 35 U.S.C. §119 to U.S. Provisional Application 60/759,053 filed in the U.S. on Jan. 17, 2006, and as a continuation application under 35 U.S.C. §120 to PCT/CH2006/000156 filed as an International Application on Mar. 16, 2006 designating the U.S., the entire contents of which are hereby incorporated by reference in their entireties.

TECHNICAL FIELD

The disclosure relates to the field of drive systems. It is based on a fuel/electric drive system.

BACKGROUND INFORMATION

Nowadays fuel/electric drive systems are being increasingly used in marine applications as well as rail-bound vehicles and in automobiles. Such a known fuel/electric drive system is shown by way of example in FIG. 1. In said figure, the contemporary fuel/electric drive system has an internal combustion engine and a generator which is driven by the internal combustion engine. A transmission is typically connected between the internal combustion engine and the generator. The generator typically has a single stator winding set. A rectifier is connected on the alternating voltage side to this stator winding set. The rectifier is also connected on the direct voltage side to a direct voltage circuit, with a power inverter for feeding a drive motor being connected to the direct voltage circuit.

Figure 1:
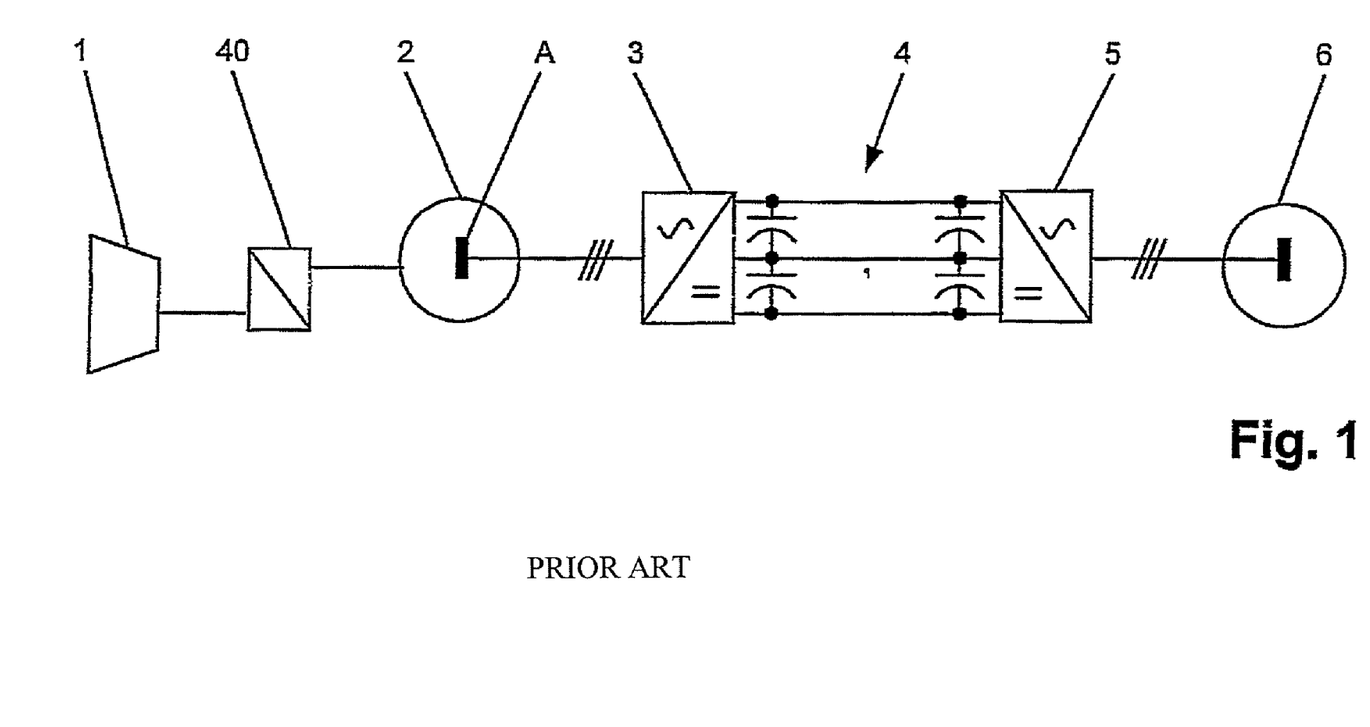
FIG. 1 shows a known fuel/electric drive system.

The problem with a known fuel/electric drive system described above, in particular the fuel/electric drive system according to FIG. 1, is that when the generator fails, for example due to a fault or short circuit in one of the stator winding sets, the drive motor can no longer be fed sufficiently and the entire drive system is therefore no longer available. In addition, the downstream elements, such as the rectifier, direct voltage circuit, power inverter and drive motor, can be damaged when the generator fails.

SUMMARY

Exemplary embodiments disclosed herein can make available a robust fuel/electric drive system which also has a high level of availability.

A fuel/electric drive system having an internal combustion engine, having a generator which is driven by the internal combustion engine and which has a first stator winding set, having a first rectifier which is connected on the alternating voltage side to the first stator winding set and on the direct voltage side to a first direct voltage circuit, having a first power inverter which is connected on the direct voltage side to the first direct voltage circuit and on the alternating voltage side to a drive motor, wherein the generator has a second stator winding set, in that a second rectifier is connected on the alternating voltage side to the second stator winding set and on the direct voltage side to a second direct voltage circuit, and in that a second power inverter is connected on the direct voltage side to the second direct voltage circuit and on the alternating voltage side to the drive motor.

In another aspect, a fuel/electric drive arrangement is disclosed based on a generator. Such an exemplary drive arrangement comprises a first stator winding set; a first direct voltage circuit; a first rectifier which is connected on an alternating voltage side to the first stator winding set and on a direct voltage side to the first direct voltage circuit; a drive motor; a first power inverter which is connected on a direct voltage side to the first direct voltage circuit and on an alternating voltage side to the drive motor; a second stator winding set; a second direct voltage circuit; a second rectifier connected on an alternating voltage side to the second stator winding set and on a direct voltage side to the second direct voltage circuit; and a second power inverter connected on a direct voltage side to the second direct voltage circuit and on an alternating voltage side to the drive motor.

This object and further objects, advantages and features of the present disclosure are clear from the following detailed description of exemplary embodiments of the disclosure in conjunction with the drawing.

The reference symbols used in the drawing and their meaning are listed together in the list of reference symbols. Basically, identical parts are provided with identical reference symbols in the figures. The described embodiments are examples of the subject matter of the disclosure and do not have a restrictive effect.

DETAILED DESCRIPTION

The fuel/electric drive system comprises an internal combustion engine and a generator which is driven by the internal combustion engine and which has a first stator winding set. Furthermore, the fuel/electric drive system comprises a first rectifier which is connected on the alternating voltage side to the first stator winding set and on the direct voltage side to a first direct voltage circuit. In addition, the fuel/electric drive system comprises a first power inverter which is connected on the direct voltage side to the first direct voltage circuit and on the alternating voltage side to a drive motor. According to the disclosure, the generator has a second stator winding set. Furthermore, a second rectifier is connected on the alternating voltage side to the second stator winding set and on the direct voltage side to a second direct voltage circuit. Furthermore, a second power inverter is connected on the direct voltage side to the second direct voltage circuit and on the alternating voltage side to the drive motor. Via the second stator winding set, the second rectifier which is connected to it and the power inverter which is connected to the second rectifier via the second direct voltage circuit, a redundant feed path for feeding the drive motor is advantageously provided so that, for example, in the event of a fault or short circuit in one of the two stator winding sets, the drive motor can advantageously be fed via the other feed path which is not subject to a fault. The drive system therefore continues to be available in the event of a fault. Accordingly, the fuel/electric drive system according to the disclosure is overall very robust. Furthermore, the internal combustion engine can be operated with a variable rotational speed and therefore advantageously in a way which is efficient in terms of fuel by means of the generator with the two stator winding sets and the downstream elements of the drive system. In addition, by virtue of the operation with a variable rotational speed, it is possible to dispense with a transmission between the internal combustion engine and generator.

Figure 2:
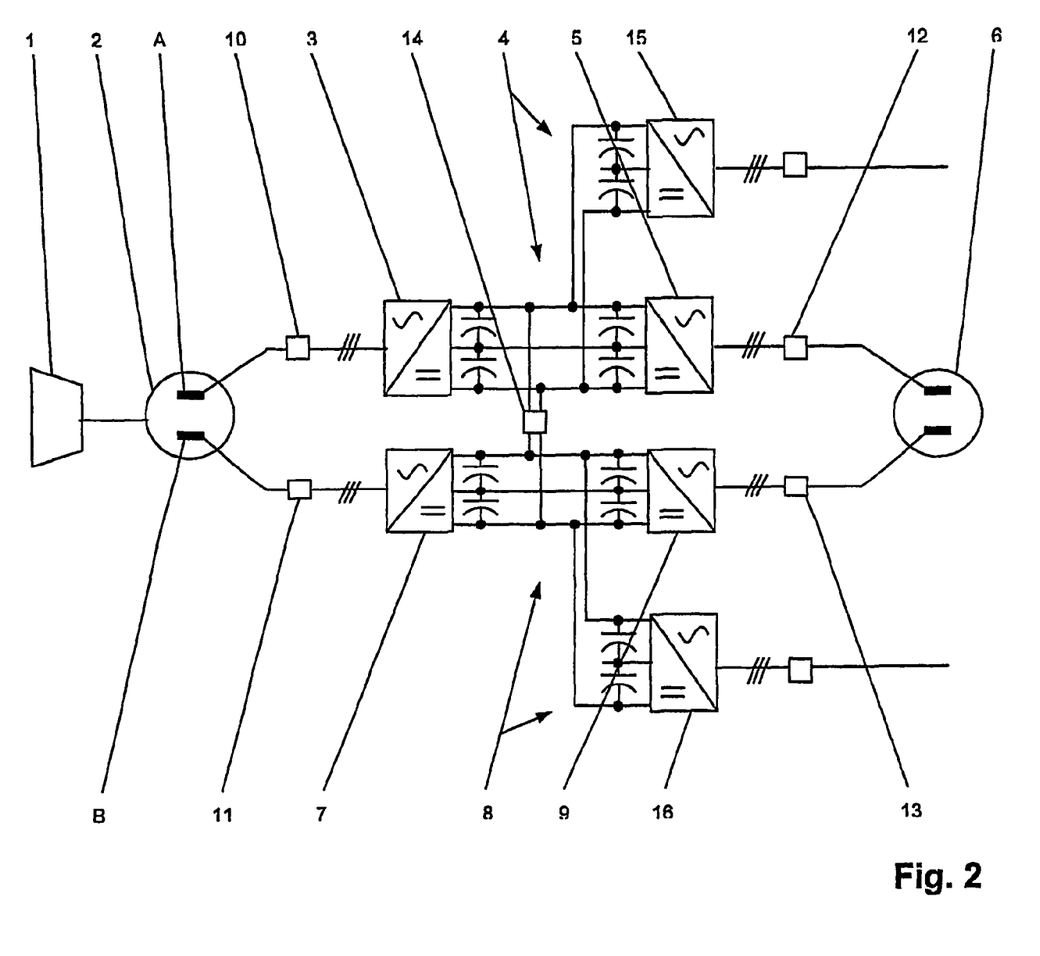
FIG. 2 shows a first exemplary embodiment of the fuel/electric drive system according to the disclosure.

FIG. 2 shows a first exemplary embodiment of the fuel/electric drive system according to the disclosure. In said figure, the fuel/electric drive system comprises an internal combustion engine 1 and a generator 2 which is driven by the internal combustion engine 1 and which has a first stator winding set A. The internal combustion engine 1 is embodied, for example, as a diesel engine, as a gas turbine or generally as any internal combustion engine which is known to a person skilled in the art. Furthermore, the fuel/electric drive system comprises a first rectifier 3 which is connected on the alternating voltage side to the first stator winding set A and on the direct voltage side to a first direct voltage circuit 4. In addition, the fuel/electric drive system comprises a first power inverter 5 which is connected on the direct voltage side to the first direct voltage circuit 4 and on the alternating voltage side to a drive motor 6.

According to the disclosure, the generator 1 has a second stator winding set A. Generally, each stator winding set A, B comprises e phase windings, where e≧3. In the exemplary embodiment in FIG. 2 and in the exemplary embodiments according to FIGS. 3 to 6 which are described below in detail, in each case two stator winding sets A, B with in each case e=3 phase windings are assumed. Furthermore, according to FIG. 2, a second rectifier 7 is connected on the alternating voltage side to the second stator winding set B and on the direct voltage side to a second direct voltage circuit 8. Moreover, a second power inverter 9 is connected on the direct voltage side to the second direct voltage circuit 8 and on the alternating voltage side to the drive motor 6. The drive motor 6 likewise generally comprises two stator winding sets, each stator winding set having a phase winding, where a≧3. In the exemplary embodiment in FIG. 2 and in the exemplary embodiments according to FIGS. 3 to 6 which are described below in detail, in each case two stator winding sets with in each case a=3 phase windings are assumed for the drive motor 6. Using the second stator winding set B of the generator 2, of the second rectifier 7 which is connected to it and of the power inverter 9 which is connected to the second rectifier 7 via the second direct voltage circuit 8, a redundant feed path for feeding the drive motor 6 is advantageously provided so that, for example, in the event of a fault or short circuit in one of the two stator winding sets A, B, the drive motor 6 can advantageously be fed via the other feed path which is not subject to a fault. As a result, the fuel/electric drive system continues to be available in the event of a fault, i.e. the drive motor 6 can continue to be fed. Accordingly, the fuel/electric drive system according to the disclosure is very robust overall and has a high level of availability. Furthermore, the internal combustion engine 1 can be operated with a variable rotational speed and therefore advantageously in a way which is efficient in terms of fuel by means of the generator 2 with the two stator winding sets A, B and the downstream elements 3, 4, 5, 6 of the drive system. In addition, by virtue of the operation with a variable rotational speed it is possible to dispense with a transmission 40 which is customarily connected between the internal combustion engine 1 and the generator 2, as is shown in the known fuel/electric drive system.

According to FIG. 2, an isolating switch 10 is connected into the connection of the first stator winding set A to the first rectifier 3, and an isolating switch 11 is connected into the connection of the second stator winding set B to the second rectifier 7. If, for example, a fault occurs in one of the stator winding sets A, B of the generator 2, the rectifier 3, 7 which is connected to the stator winding set A, B which is subject to a fault can be disconnected easily and quickly by means of the respective isolating switch 10, 11, and this rectifier 3, 7 and the downstream elements such as the direct voltage circuit 4, 8, power inverter 5, 9 and drive motor 6 can be protected against damage or even destruction. Of course, the respective isolating switch 10, 11 also permits the respective stator winding set A, B of the generator 2 to be disconnected in the event of a fault on the part of the respective rectifier 3, 7. The respective isolating switch 10, 11 of course also permits the corresponding stator winding set A, B to be reconnected to the respective rectifier 3, 7, for example after the fault which occurs has been checked or after maintenance or repair work.

According to FIG. 2, an isolating switch 12 is connected into the connection of the first power inverter 5 to the drive motor 6 and an isolating switch 13 is also connected into the connection of the second power inverter 9 to the drive motor 6. If, for example, a fault occurs in the drive motor 6, the respective power inverter 5, 9 which is connected to the drive motor 6 can be disconnected easily and quickly by means of the respective isolating switch 12, 13, and the respective power inverter 5, 9 and the preceding elements such as the direct voltage circuit 4, 8, rectifier 3, 7 and generator 2 can be protected against damage or even destruction. Of course, the respective isolating switch 12, 13 also permits the drive motor 6 to be disconnected in the event of a fault on the part of the respective power inverter 5, 9. The respective isolating switch 12, 13 of course also permits the drive motor 6 to be reconnected to the respective power inverter 5, 9, for example after the fault which occurs has been checked or after maintenance or repair work.

Furthermore, the first direct voltage circuit 4 can be connected to the second direct voltage circuit 8 and disconnected from it via a connecting switch 14. The connecting switch 14 therefore makes it possible to feed one of the direct voltage circuits 4, 8 by means of the respective other direct voltage circuit 4, 8 if, for example, the connection of the first stator winding set A with the first rectifier 3 has been disconnected by means of the isolating switch 10, or the connection of the second stator winding set B to the second rectifier 7 has been disconnected by means of the isolating switch 11 owing to a fault as mentioned above. Accordingly, in the event of a fault, the drive motor 6 can also advantageously be fed from the first direct voltage circuit 4 by means of the first power inverter 5, and additionally also fed from the second direct voltage circuit 8 by means of the second power inverter 9.

In addition, x further power inverters 15 are generally connected on the direct voltage side to the first direct voltage circuit 4, where x≧1, and in FIG. 2 x=1 such further power inverters 15 are connected on the direct voltage side to the first direct voltage circuit 4. Each of the further x power inverters 15 makes it advantageously possible to feed, for example, a further drive motor but also, for example, to feed auxiliary operating devices such as fans, air-conditioning systems, actuator motors etc. Of course, such a power inverter 15 is also designed to be capable of feeding back energy. In addition, generally y further power inverters 16 are connected on the direct voltage side to the second direct voltage circuit 8, where y≧1, and in FIG. 2 y=1 such further power inverters 16 are connected on the direct voltage side to the second direct voltage circuit 8. Each of the further y power inverters 16 also advantageously makes it possible in this case to feed, for example, a further drive motor but also to feed, for example, auxiliary operating devices such as fans, air-conditioning systems, actuator motors etc.

Figure 3:
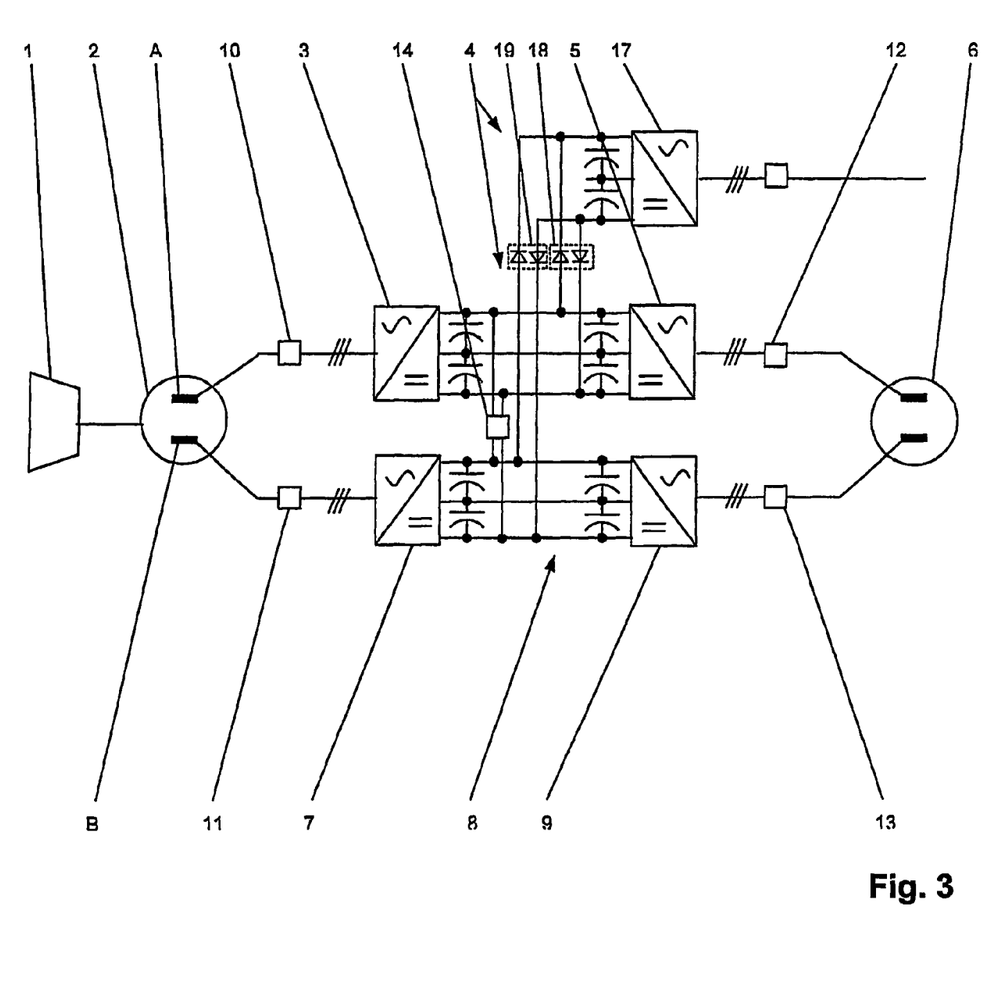
FIG. 3 shows a second exemplary embodiment of the fuel/electric drive system according to the disclosure.

FIG. 3 shows a second exemplary embodiment of the fuel/electric drive system according to the disclosure. On the basis of FIG. 2, the fuel/electric drive system according to FIG. 3 generally has z further power inverters 17 which are connected on the direct voltage side to the first direct voltage circuit 4 and to the second direct voltage circuit 8, where $z \geq 1$, and in FIG. 3 z=1 such further power inverters 17 are connected on the direct voltage side to the first direct voltage circuit 4 and to the second direct voltage circuit 8. As a result, each of the further z power inverters 17 can advantageously be fed from both direct voltage circuits 4, 8, in which case each of the further z power inverters 17 makes it possible to feed, for example, a further drive motor but also to feed, for example, auxiliary operating devices such as fans, air-conditioning systems, actuator motors etc. Of course, such a power inverter 17 is also designed to be capable of feeding back energy. According to FIG. 3, an element 18 for limiting the direction of current is connected into each connection of the first direct voltage circuit 4 to one of the z further power inverters 17, and an element 19 for limiting the direction of current is connected into each connection of the second direct voltage circuit 8 to one of the z further power inverters 17. The respective element 18, 19 for limiting the direction of current serves to ensure that only a current in a defined direction of current flows from the respective direct voltage circuit 4, 8 to the respective power inverter 17 of the z further power inverter 17 and back again in a defined fashion. This advantageously avoids a situation in which a faulty current, caused for example by faults in the respective direct voltage circuits 4, 8 and/or by a fault in one of the z further power inverters 17, can flow to the respective power inverter 17 or into the respective direct voltage circuit 4, 8 and damages or even destroys the respective power inverter 17 or the elements which are directly and indirectly connected to the respective direct voltage circuit 4, 8. The respective element 18,19 for limiting the direction of current can be embodied by means of diodes according to FIG. 3 and therefore can be implemented in a way which is very simple and space-saving. However, switching elements which can be actuated, in particular power semiconductor switches which can be actuated, are also conceivable. It is to be noted that the z further power inverters 17 and their connections on the direct voltage side which are described in detail above with reference to FIG. 3 can also be combined with the fuel/electric drive system according to FIG. 2 and with the fuel/electric drive systems according to FIG. 4, FIG. 5 and FIG. 6 which are also described in detail below.

Figure 4:
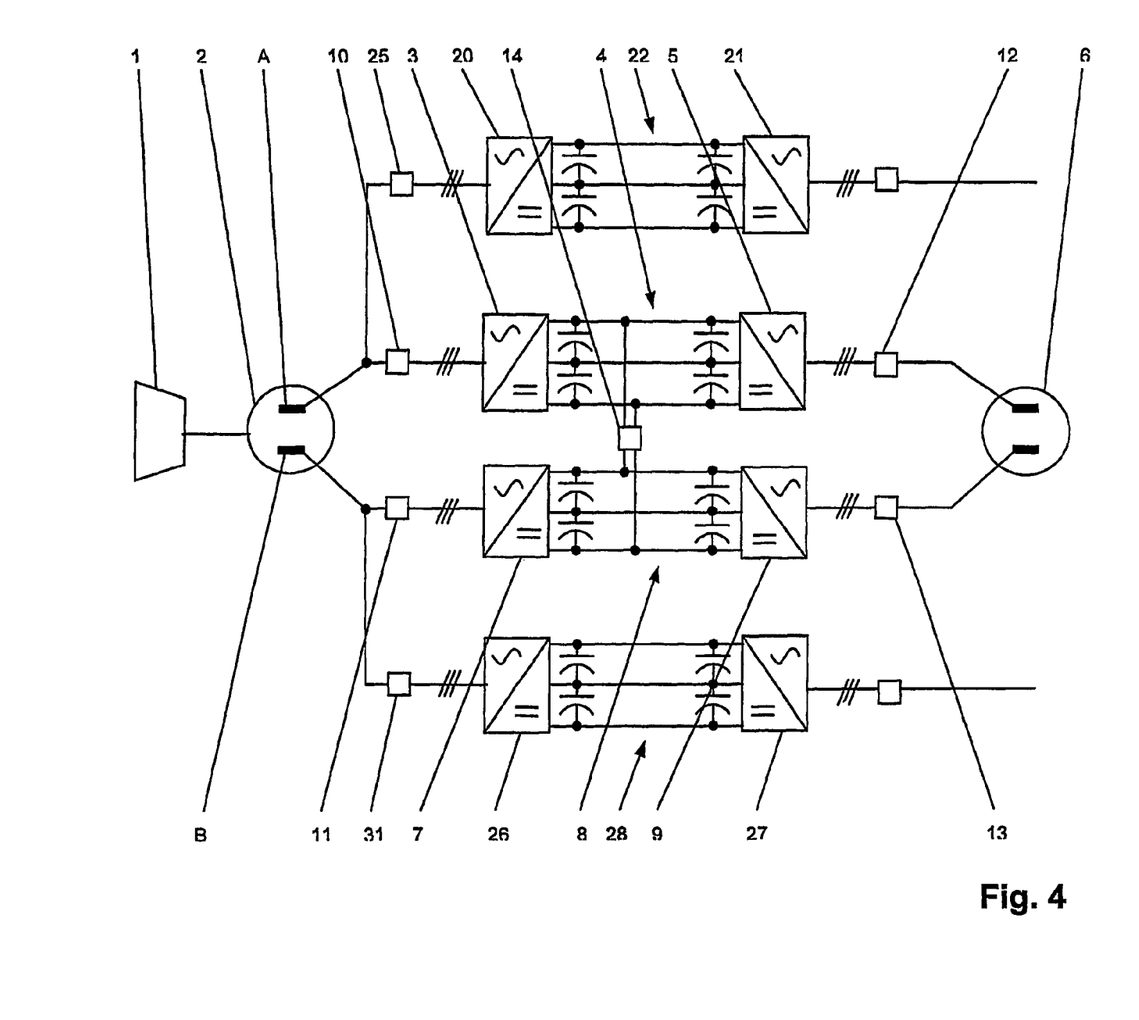
FIG. 4 shows a third exemplary embodiment of the fuel/electric drive system according to the disclosure.

FIG. 4 illustrates a third exemplary embodiment of the fuel/electric drive system according to the disclosure. On the basis of FIG. 2, generally n further rectifiers 20 are connected on the alternating voltage side to the first stator winding set A according to FIG. 4, where $n \geq 1$, and in FIG. 4 n=1 further rectifiers 20 are connected on the alternating voltage side to the first stator winding set A. In addition, according to FIG. 4 generally m further power inverters 21 are connected to in each case one of the n rectifiers 20 via a direct voltage circuit 22 which is provided for each of the n further rectifiers 20, where $m \geq 1$, and in FIG. 4 m=1 further power inverters 21 are connected to in each case one of the n rectifiers 20 via a direct voltage circuit 22 which is provided for each of the n further rectifiers 20. The first stator winding set A can therefore be used to feed, for example, not only a further drive motor but, for example, also auxiliary operating devices such as fans, air-conditioning systems, actuator motors etc. by means of the respective further power inverter 21 of the m further power inverters 21 separately from and independently of the first and second direct voltage circuit 4, 8. Furthermore, according to FIG. 4, p further rectifiers 26 are connected on the alternating voltage side to the second stator winding set B, where $p \geq 1$, and in FIG. 4 p=1 further rectifiers 26 are connected on the alternating voltage side to the second stator winding set B. In addition, according to FIG. 4 generally q further power inverters 27 are connected in each case to one of the p rectifiers 26 via a direct voltage circuit 28 which is provided for each of the p further rectifiers 26, where $q \geq 1$, and in FIG. 4 q=1 further power inverters 27 are connected to in each case one of the p rectifiers 26 via a direct voltage circuit 28 which is provided for each of the p further rectifiers 26. The second stator winding set B can therefore be used to feed, for example, not only a further drive motor but, for example, also auxiliary operating devices such as fans, air-conditioning systems, actuator motors etc. by means of the respective further power inverter 27 of the m further power inverters 26 separately from and independently of the first and second direct voltage circuits 4, 8. According to FIG. 4, an isolating switch 25 is connected into each connection of the first stator winding set A to one of the n further rectifiers 20. Furthermore, according to FIG. 4, an isolating switch 31 is additionally connected into each connection of the second stator winding set B to one of the p further rectifiers 26. If, for example, a fault occurs in one of the stator winding sets A, B of the generator 2, the further rectifier 20, 26 which is connected to the stator winding set A, B which is subject to a fault can be disconnected easily and quickly by means of the respective isolating switch 25, 31, and this further rectifier 20, 26 and the downstream elements such as the direct voltage circuit 22, 28 and further power inverters 21, 27 can be protected against damage or even destruction. Of course, the respective isolating switch 25, 31 also permits the respective stator winding set A, B of the generator 2 to be disconnected in the event of a fault on the part of the respective further rectifier 20, 26. Of course, the respective isolating switch 25, 31 also permits the corresponding stator winding set A, B to be reconnected to the respective further rectifier 20, 26, for example after the fault which occurs has been checked or after maintenance or repair work. It is to be noted that the n further rectifiers 20 and their connections which are described above in detail with respect to FIG. 4 and the p further rectifiers 26 and their connections which are described above in detail with respect to FIG. 4 can also be combined with the fuel/electric drive system according to FIG. 2, FIG. 3 and with the fuel/electric drive systems according to FIG. 5 and FIG. 6 which are also described in detail below.

Figure 5:
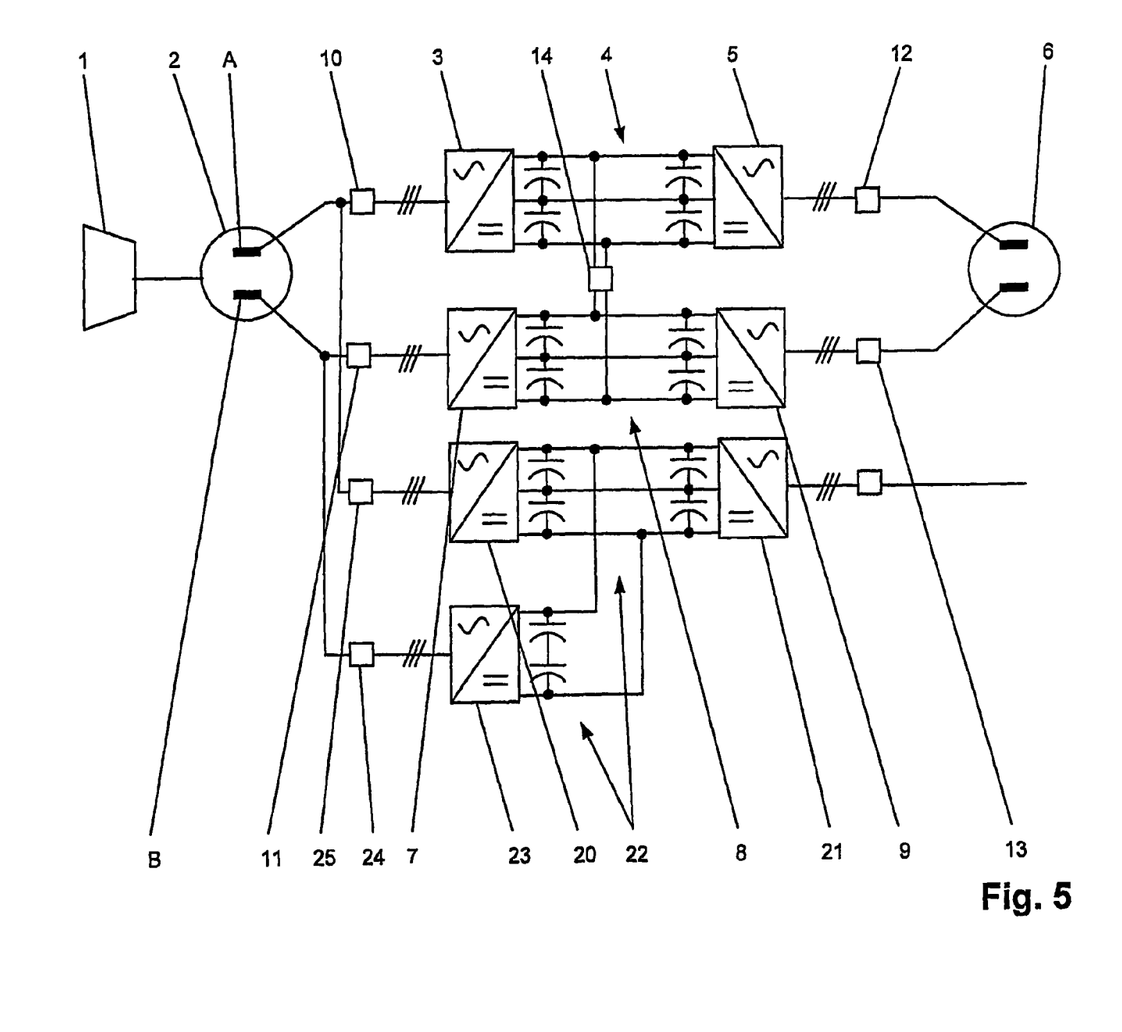
FIG. 5 shows a fourth exemplary embodiment of the fuel/electric drive system according to the disclosure.

FIG. 5 shows a fourth exemplary embodiment of the fuel/electric drive system according to the disclosure. On the basis of FIG. 4, n further rectifiers 20 are connected on the alternating voltage side to the first stator winding set A according to FIG. 5, in a way which generally corresponds to FIG. 4, where $n \geq 1$, and in FIG. 5 n=1 further rectifiers 20 are connected on the alternating voltage side to the first stator winding set A. In addition, according to FIG. 5 generally m further power inverters 21 are connected to in each case one of the n rectifiers 20 via a direct voltage circuit 22 which is provided for each of the n further rectifiers 20, where $m \geq 1$, and in FIG. 5 m=1 further power inverters 21 are connected to in each case one of the n rectifiers 20 via a direct voltage circuit 22 which is provided for each of the n further rectifiers 20. The first stator winding set A can therefore be used to feed, for example, not only a further drive motor but, for example, also auxiliary operating devices such as fans, air-conditioning systems, actuator motors etc. separately from and independently of the first and second direct voltage circuits 4, 8 by means of the respective further power inverter 21 of the m further power inverters 21. According to FIG. 5, an isolating switch 25 is connected into each connection of the first stator winding set A to one of the n further rectifiers 20, in which context the statements relating to FIG. 4 should be referred to with regard to the method of functioning and advantages. Furthermore, according to FIG. 5 generally r further rectifiers 23 are connected on the alternating voltage side to the second stator winding set B, where r≧1 and n≧r, and in FIG. 5 r=1 further rectifiers 23 are connected on the alternating voltage side to the second stator winding set B. In addition, according to FIG. 5, each of the r further rectifiers 23 is connected on the direct voltage side to in each case one of the direct voltage circuits 22 which are provided for the n further rectifiers 20. In the event of a fault, for example in the first stator winding set A of the generator 2, the respective further rectifier 20 is disconnected by means of the isolating switch 25, in which case the direct voltage circuit 22 which is connected to the further disconnected rectifier 20 can advantageously be fed by means of the further rectifier 23 thereby making it possible to feed not only a further drive motor but, for example, also auxiliary operating devices such as fans, air-conditioning systems, actuator motors etc. from this direct voltage circuit 22 by means of the further power inverter 21, even in such a case of a fault. In addition, an isolating switch 24, which advantageously permits the further respective rectifier 23 to be disconnected and reconnected to the second stator winding set B of the generator 2, is connected into each connection of the second stator winding set B to one of the r further rectifiers 23. It is to be noted that the r further rectifiers 23 and their connections which are described in detail above with reference to FIG. 5 can also be combined with the fuel/electric drive system according to FIG. 2, FIG. 3 and FIG. 4 as well as with the fuel/electric drive system according to FIG. 6 which is described in detail below.

Figure 6:
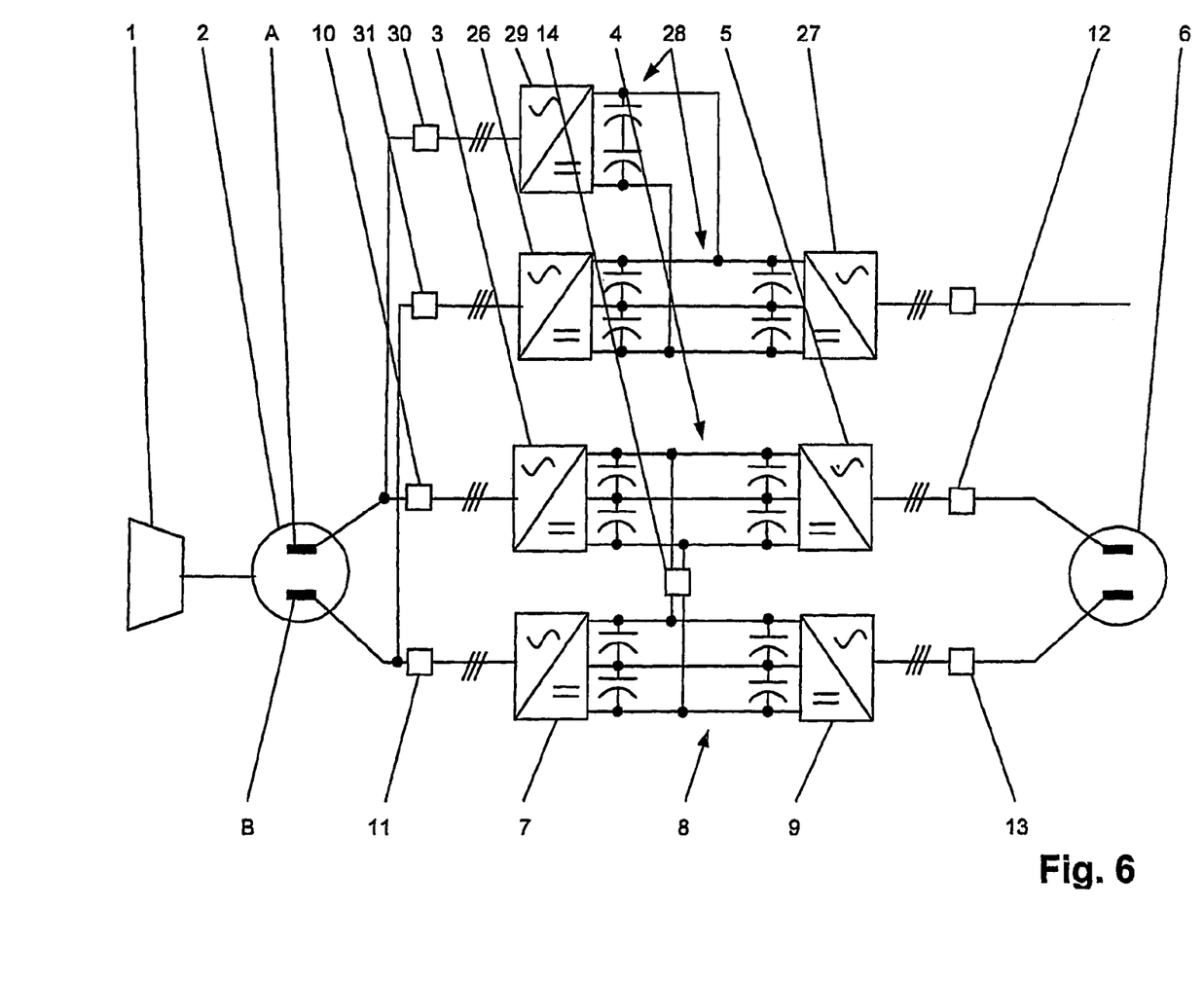
FIG. 6 shows a fifth exemplary embodiment of the fuel/electric drive system according to the disclosure.

FIG. 6 shows a fifth exemplary embodiment of the fuel/electric drive system according to the disclosure. On the basis of FIG. 4, p further rectifiers 26 are connected on the alternating voltage side to the second stator winding set B according to FIG. 6 in a way which generally corresponds to FIG. 4, where p≧1, and in FIG. 4 p=1 further rectifiers 26 are connected on the alternating voltage side to the second stator winding set B. In addition, according to FIG. 6, q further power inverters 27 are generally connected in each case to one of the p rectifiers 26 via a direct voltage circuit 28 which is provided for each of the p further rectifiers 26, where q≧1, and in FIG. 4 q=1 further power inverters 27 are connected to in each case one of the p rectifiers 26 via a direct voltage circuit 28 which is provided for each of the p further rectifiers 26. The second stator winding set B can therefore be used to feed, for example, not only a further drive motor but, for example, also auxiliary operating devices such as fans, air-conditioning systems, actuator motors etc. separately from and independently of the first and second direct voltage circuits 4, 8 by means of the respective further power inverter 27 of the m further power inverters 27. According to FIG. 6, an isolating switch 31 is connected into each connection of the second stator winding set B to one of the p further rectifiers 26, and in this context the statements relating to FIG. 4 should be referred to with regard to the method of functioning and advantages. Furthermore, according to FIG. 5 generally v further rectifiers 29 are connected on the alternating voltage side to the first stator winding set A, where v≧1 and p≧v, and in FIG. 6 v=1 further rectifiers 29 are connected on the alternating voltage side to the first stator winding set A. In addition, according to FIG. 6 each of the v further rectifiers 29 is connected on the direct voltage side to in each case one of the direct voltage circuits 28 which are provided for the p further rectifiers 26. In the event of a fault in, for example, the second stator winding set B of the generator 2, the respective further rectifier 26 is disconnected by means of the isolating switch 31, in which case the direct voltage circuit 28 which is connected to the further disconnected rectifier 26 can advantageously be fed by means of the further rectifier 29, therefore making it possible to feed a further drive motor and, for example, also to feed auxiliary operating devices such as fans, air-conditioning systems, actuator motors etc. from this direct voltage circuit 28 by means of the further power inverter 27, even in such a case of a fault. In addition, an isolating switch 30, which advantageously permits the respective further rectifier 29 to be disconnected and reconnected to the first stator winding set A of the generator 2, is connected into each connection of the first stator winding set A to one of the v further rectifiers 29. It is to be noted that the v further rectifiers 29 and their connections which are described in detail above with reference to FIG. 6 can also be combined with the fuel/electric drive system according to FIG. 2, FIG. 3, FIG. 4 and FIG. 5.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Internal combustion engine
2 Generator
3 First rectifier
4 First direct voltage circuit
5 First power inverter
6 Drive motor
7 Second rectifier
8 Second direct voltage circuit
9 Second power inverter
10, 11, 12 Isolating switch
13, 24, 25
30, 31
14 Connecting switch
15 x further power inverters, where x≧1
16 y further power inverters, where y≧1
17 z further power inverters, where z≧1
18, 19 Element for limiting the direction of current
20 n further rectifiers, where n≧1
21 m further power inverters, where m≧1
22 Direct voltage circuit of each of the n further rectifiers 20
23 r further rectifiers, where r≧1
26 p further rectifiers, where p≧1
27 q further power inverters, where q≧1
28 Direct voltage circuit of each of the p further rectifiers 26
29 v further rectifiers, where v≧1
40 Transmission
A, B Stator winding sets of the generator

What is claimed is:
1. A fuel/electric drive system comprising:
an internal combustion engine;
a generator which is driven by the internal combustion engine and which has a first stator winding set;

a first rectifier which is connected on the alternating voltage side to the first stator winding set and on the direct voltage side to a first direct voltage circuit;
a first power inverter which is connected on the direct voltage side to the first direct voltage circuit and on the alternating voltage side to a drive motor,
wherein the generator has a second stator winding set,
wherein a second rectifier is connected on the alternating voltage side to the second stator winding set and on the direct voltage side to a second direct voltage circuit,
wherein a second power inverter is connected on the direct voltage side to the second direct voltage circuit and on the alternating voltage side to the drive motor, and
wherein x further power inverters are connected on the direct voltage side to the first direct voltage circuit, where x>1.

2. The fuel/electric drive system as claimed in claim 1, wherein an isolating switch is connected into the connection of the first stator winding set to the first rectifier, and
wherein an isolating switch is connected into the connection of the second stator winding set to the second rectifier.

3. The fuel/electric drive system as claimed in claim 2, wherein an isolating switch is connected into the connection of the first power inverter to the drive motor, and
wherein an isolating switch is connected into the connection of the second power inverter to the drive motor.

4. The fuel/electric drive system as claimed in claim 1, wherein an isolating switch is connected into the connection of the first power inverter to the drive motor, and
wherein an isolating switch is connected into the connection of the second power inverter to the drive motor.

5. The fuel/electric drive system as claimed in claim 4, wherein the first direct voltage circuit can be connected to the second direct voltage circuit and disconnected from it via a connecting switch.

6. The fuel/electric drive system as claimed in claim 1, wherein the first direct voltage circuit can be connected to the second direct voltage circuit and disconnected from it via a connecting switch.

7. The fuel/electric drive system as claimed in claim 1, wherein y further power inverters are connected on the direct voltage side to the second direct voltage circuit, where y>1.

8. The fuel/electric drive system as claimed in claim 7, wherein z further power inverters are connected on the direct voltage side to the first direct voltage circuit and to the second direct voltage circuit, where z>1.

9. The fuel/electric drive system as claimed in claim 1, wherein z further power inverters are connected on the direct voltage side to the first direct voltage circuit and to the second direct voltage circuit, where z>1.

10. The fuel/electric drive system as claimed in claim 9, wherein an element for limiting the direction of current is connected into each connection of the first direct voltage circuit to one of the z further power inverters, and
wherein an element for limiting the direction of current is connected into each connection of the second direct voltage circuit to one of the z further power inverters.

11. The fuel/electric drive system as claimed in claim 10, wherein n further rectifiers are connected on the alternating voltage side to the first stator winding set, where n>1,
and wherein m further power inverters are connected to in each case one of the n rectifiers via a direct voltage circuit which is provided for each of the n further rectifiers, where m>1.

12. The fuel/electric drive system as claimed in claim 1, wherein n further rectifiers are connected on the alternating voltage side to the first stator winding set, where n>1,
and wherein m further power inverters are connected to in each case one of the n rectifiers via a direct voltage circuit which is provided for each of the n further rectifiers, where m>1.

13. The fuel/electric drive system as claimed in claim 12, wherein r further rectifiers are connected on the alternating voltage side to the second stator winding set, where r>1 and n>1, and
wherein each of the r further rectifiers is connected on the direct voltage side to in each case one of the direct voltage circuits which are provided for the n further rectifiers.

14. The fuel/electric drive system as claimed in claim 13, wherein an isolating switch is connected into each connection of the second stator winding set to one of the r further rectifiers.

15. The fuel/electric drive system as claimed in claim 14, wherein an isolating switch is connected into each connection of the first stator winding set to one of the n further rectifiers.

16. The fuel/electric drive system as claimed in claim 12, wherein an isolating switch is connected into each connection of the first stator winding set to one of the n further rectifiers.

17. The fuel/electric drive system as claimed in claim 16, wherein p further rectifiers are connected on the alternating voltage side to the second stator winding set, where p>1,
and wherein q further power inverters are connected in each case to one of the p rectifiers via a direct voltage circuit which is provided for each of the p further rectifiers, where q>1.

18. The fuel/electric drive system as claimed in claim 1, wherein p further rectifiers are connected on the alternating voltage side to the second stator winding set, where p>1,
and wherein q further power inverters are connected in each case to one of the p rectifiers via a direct voltage circuit which is provided for each of the p further rectifiers, where q>1.

19. The fuel/electric drive system as claimed in claim 18, wherein v further rectifiers are connected on the alternating voltage side to the first stator winding set, where v>1 and p>1, and
wherein each of the v further rectifiers is connected on the direct voltage side to in each case one of the direct voltage circuits which are provided for the p further rectifiers.

20. The fuel/electric drive system as claimed in claim 19, wherein an isolating switch is connected into each connection of the first stator winding set to one of the v further rectifiers.

21. The fuel/electric drive system as claimed in claim 20, wherein an isolating switch is connected into each connection of the second stator winding set to one of the p further rectifiers.

22. The fuel/electric drive system as claimed in claim 18, wherein an isolating switch is connected into each connection of the second stator winding set to one of the p further rectifiers.

23. A fuel/electric drive arrangement based on a generator, comprising:
a first stator winding set;
a first direct voltage circuit;
a first rectifier which is connected on an alternating voltage side to the first stator winding set and on a direct voltage side to the first direct voltage circuit;
a drive motor;

a first power inverter which is connected on a direct voltage side to the first direct voltage circuit and on an alternating voltage side to the drive motor;

a second stator winding set;

a second direct voltage circuit;

a second rectifier connected on an alternating voltage side to the second stator winding set and on a direct voltage side to the second direct voltage circuit;

a second power inverter connected on a direct voltage side to the second direct voltage circuit and on an alternating voltage side to the drive motor: and x further power inverters connected on the direct voltage side to the first direct voltage circuit, where x>1.

24. The fuel/electric drive arrangement as claimed in claim 23, wherein the generator is driven by an internal combustion engine.

* * * * *